US012688789B2

(12) United States Patent
Minen et al.

(10) Patent No.: US 12,688,789 B2
(45) Date of Patent: Jul. 21, 2026

(54) APPARATUS FOR SIMULATING DRIVING A LAND VEHICLE

(71) Applicant: VI-grade GmbH, Darmstadt (DE)

(72) Inventors: Diego Minen, Udine (IT); Francesco La Mura, Saronno (IT); Hermes Giberti, Bergamo (IT); Giovanni Todeschini, Lecco (IT)

(73) Assignee: VI-GRADE GMBH, Darmstadt (DE)

( * ) Notice: Subject to any disclaimer, the term of this patent is extended or adjusted under 35 U.S.C. 154(b) by 795 days.

(21) Appl. No.: 18/013,623

(22) PCT Filed: Jul. 7, 2021

(86) PCT No.: PCT/EP2021/068771
§ 371 (c)(1),
(2) Date: Dec. 29, 2022

(87) PCT Pub. No.: WO2022/008568
PCT Pub. Date: Jan. 13, 2022

(65) Prior Publication Data
US 2023/0237927 A1      Jul. 27, 2023

(30) Foreign Application Priority Data

Jul. 9, 2020      (IT) ........................ 102020000016720

(51) Int. Cl.
*G09B 9/05*      (2006.01)
(52) U.S. Cl.
CPC ..................................... *G09B 9/05* (2013.01)

(58) Field of Classification Search
None
See application file for complete search history.

(56) References Cited

U.S. PATENT DOCUMENTS

| | | | | |
|---|---|---|---|---|
| 6,099,217 A * | 8/2000 | Wiegand | ................ | B23Q 17/22 |
| | | | | 901/41 |
| 6,110,049 A * | 8/2000 | Wilkens | .............. | G01M 17/007 |
| | | | | 472/36 |
| 9,466,223 B2 * | 10/2016 | Stevens | .................... | G09B 9/04 |
| 10,056,007 B2 * | 8/2018 | Kirkman | .................. | G09B 9/52 |
| 2004/0144288 A1 * | 7/2004 | Chiang | .................... | G09B 9/02 |
| | | | | 108/1 |

(Continued)

FOREIGN PATENT DOCUMENTS

| | | | | |
|---|---|---|---|---|
| CN | 204480577 U | * | 7/2015 | |
| JP | H10110799 A | * | 4/1998 | .......... B25J 17/0266 |

(Continued)

OTHER PUBLICATIONS

International Search Report filed in PCT/EP2021/068771 mailed Oct. 13, 2021.

*Primary Examiner* — Xuan M Thai
*Assistant Examiner* — Andrew Bodendorf
(74) *Attorney, Agent, or Firm* — RANKIN, HILL & CLARK LLP

(57) ABSTRACT
An apparatus for simulating driving a land vehicle, including: a base provided with a flat support surface on which a mobile platform is positioned, a first element for moving the mobile platform, a driving position associated with the mobile platform, and a second element for moving the driving position with respect to the mobile platform.

14 Claims, 4 Drawing Sheets

(56) References Cited

U.S. PATENT DOCUMENTS

| | | | | |
|---|---|---|---|---|
| 2005/0277092 A1* | 12/2005 | Hwang | .................. | G09B 19/16 |
| | | | | 434/58 |
| 2012/0180593 A1* | 7/2012 | Alet | .................... | B25J 17/0266 |
| | | | | 74/490.07 |
| 2015/0004567 A1* | 1/2015 | Minen | ................. | G09B 19/167 |
| | | | | 434/62 |
| 2015/0356878 A1* | 12/2015 | Warmerdam | ............ | G09B 9/00 |
| | | | | 73/865.6 |
| 2016/0379512 A1* | 12/2016 | Kirkman | ................. | G09B 9/06 |
| | | | | 434/34 |
| 2017/0053548 A1* | 2/2017 | Warne | ................. | G09B 19/167 |
| 2018/0218630 A1* | 8/2018 | Minen | ................. | G09B 19/167 |
| 2018/0247557 A1* | 8/2018 | Brice | ...................... | G09B 9/04 |

FOREIGN PATENT DOCUMENTS

| | | | | |
|---|---|---|---|---|
| JP | 2011021681 | A | * | 2/2011 |
| JP | 5477737 | B2 | * | 4/2014 |
| WO | 2014/087172 | | | 6/2014 |
| WO | 2018/055387 | | | 3/2018 |

* cited by examiner

APPARATUS FOR SIMULATING DRIVING A LAND VEHICLE

FIELD OF THE INVENTION

The present invention concerns an apparatus for simulating driving a land vehicle, such as mainly a car, a bus, a van, or other similar or comparable vehicle.

In particular, the apparatus according to the present invention is able to reproduce, in an extremely faithful way, any real driving condition of one of the vehicles as above, along predetermined routes and with the driving modes determined by a driver.

The present invention can also be used for training specific personnel to drive, for particular activities and/or for simulating the driving experience for one or more passengers without a driver.

BACKGROUND OF THE INVENTION

Various types of apparatus for simulating driving land vehicles are known, one of which is described in WO-A-2013/114179. The known apparatus described here comprises a fixed platform, a mobile platform located above the fixed platform, and a driving position associated with the mobile platform and where a driver can take his/her place.

Three linear actuators are associated with both the base platform and the mobile platform in order to move the latter with respect to the fixed base platform in three respective linear directions, which define a Cartesian axis system.

The composition of the three linear movements determined by the actuators allows to move the mobile platform in two linear directions X, Y and to rotate it around the axis Z, so as to simulate the typical movements of a land vehicle.

The driving position usually comprises a seating element for a driver, command means such as a steering wheel, brake pedals, clutch, accelerator, etc. and a projection screen, on which the driving environment in which the driver is immersed during the simulation is projected.

The driving position is associated with the mobile platform by means of a kinematic mechanism comprising a plurality of telescopic actuators, disposed in a substantially vertical direction, or slightly angled with respect to the vertical, defining a hexapod kinematic structure. The actuators move the driving position in space both by translating it along the three coordinated axes and also by providing rotations around the axes themselves. In other words, the driving position can be moved by the kinematic mechanism as above in six degrees of freedom, and can also move in a manner integral with the mobile platform described above according to another three degrees of freedom.

Another type of apparatus for simulating driving a land vehicle is described in WO-A-2017/021323. The known apparatus described in this document, unlike what is shown in WO-A-2013/114179, provides that the movement of the mobile platform with respect to the fixed base is actuated by means of cables suitably and alternately tensioned or released.

The simulation apparatus described in WO-A-2017/021323 is particularly suitable for simulating driving where high performance is required in terms of system response times and at the same time large movement spaces for the mobile platform.

WO 2014/087172 and WO 2018/055387 disclose similar solution of simulators for vehicles, in which a movable carrier is movably supported by a first and a second drive mechanism. In both cases, the first (base) drive mechanism comprises linear guides that allow a linear movement of the movable carrier along horizontal directions.

However, there is a need to improve an apparatus for simulating driving a land vehicle of the type described above.

In particular, one purpose of the present invention is to provide an apparatus for simulating driving a land vehicle which is simple to manufacture and manage, and which allows to simulate extremely variable driving situations, representing real situations as faithfully as possible.

Another purpose of the present invention is to provide an apparatus for simulating driving a land vehicle which is economical.

Another purpose is to provide an apparatus for simulating driving a land vehicle which is compact, and which has a reduced weight and size.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the invention or variants to the main inventive idea.

In accordance with the above purposes, the present invention concerns an apparatus for simulating driving a land vehicle that comprises a fixed base, for example, but not only, a platform, provided with a flat support surface, a mobile platform located on the fixed base as above, and a driving position associated with the mobile platform.

The apparatus comprises sliding means associated with the mobile platform to allow the sliding of the latter on the flat base as above.

The apparatus also comprises first movement means associated with the fixed base and the mobile platform to translate the mobile platform on the support surface as above, in a first direction and a second direction which is coordinated with respect to the first direction, and to rotate the mobile platform around a third direction perpendicular to the support surface and coordinated with respect to the first direction and the second direction.

The mobile platform is therefore configured to translate along two directions preferably perpendicular to each other (X, Y) and to rotate along an axis (Z) that is perpendicular to the plane that contains the X, Y, directions.

The apparatus also comprises second movement means associated with the mobile platform and configured to translate and rotate the driving position in, and with respect to, a fourth direction, a fifth direction and a sixth direction.

The fourth, fifth and sixth directions define a second system of Cartesian axes which, with the mobile platform stationary and centered on the fixed base, are parallel to the first system defined by the first, second and third directions. When the platform moves, the second Cartesian axis system moves with it.

The second movement means therefore define a second movement unit mounted on, and integral with, the mobile platform and able to generate other movements which overlap those generated on the mobile platform, causing overall movements on the driving position according to nine degrees of freedom.

The second movement means comprise a plurality of linear connection elements each associated with a respective first end to the mobile platform, and with a respective second end, opposite the first end, directly or indirectly, to the driving position.

According to one characteristic aspect of the present invention, each of the first ends as above is pivoted with a base joint to a corresponding sliding block slidingly associated with a rectilinear guide, and each of the second ends as above is pivoted to the driving position with a butt or cardanic joint. The sliding block and the guide define another base joint.

According to some embodiments, the base joint is of the universal type or comprises two rotoidajoints with intersecting axes of rotation, while the butt joint is of the spherical type.

The particular combination of movement of the driving position generated by the first movement means (linear movement according to X and Y, and rotation around the Z axis) and by the second movement means (linear movement according to x, y and z, and rotation around the same three axes), ensures the movement of the driving position with respect to nine degrees of freedom, three of which are redundant since they can overlap with the same movements generated by the mobile platform. This allows to obtain a simulation apparatus that is extremely simple to manage and command, as well as extremely compact.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the possible embodiments of the invention, of which one or more examples are shown in the attached drawings by way of a non-limiting example. The phraseology and terminology used here is also for non-limiting example purposes.

Figures 1, 1A:
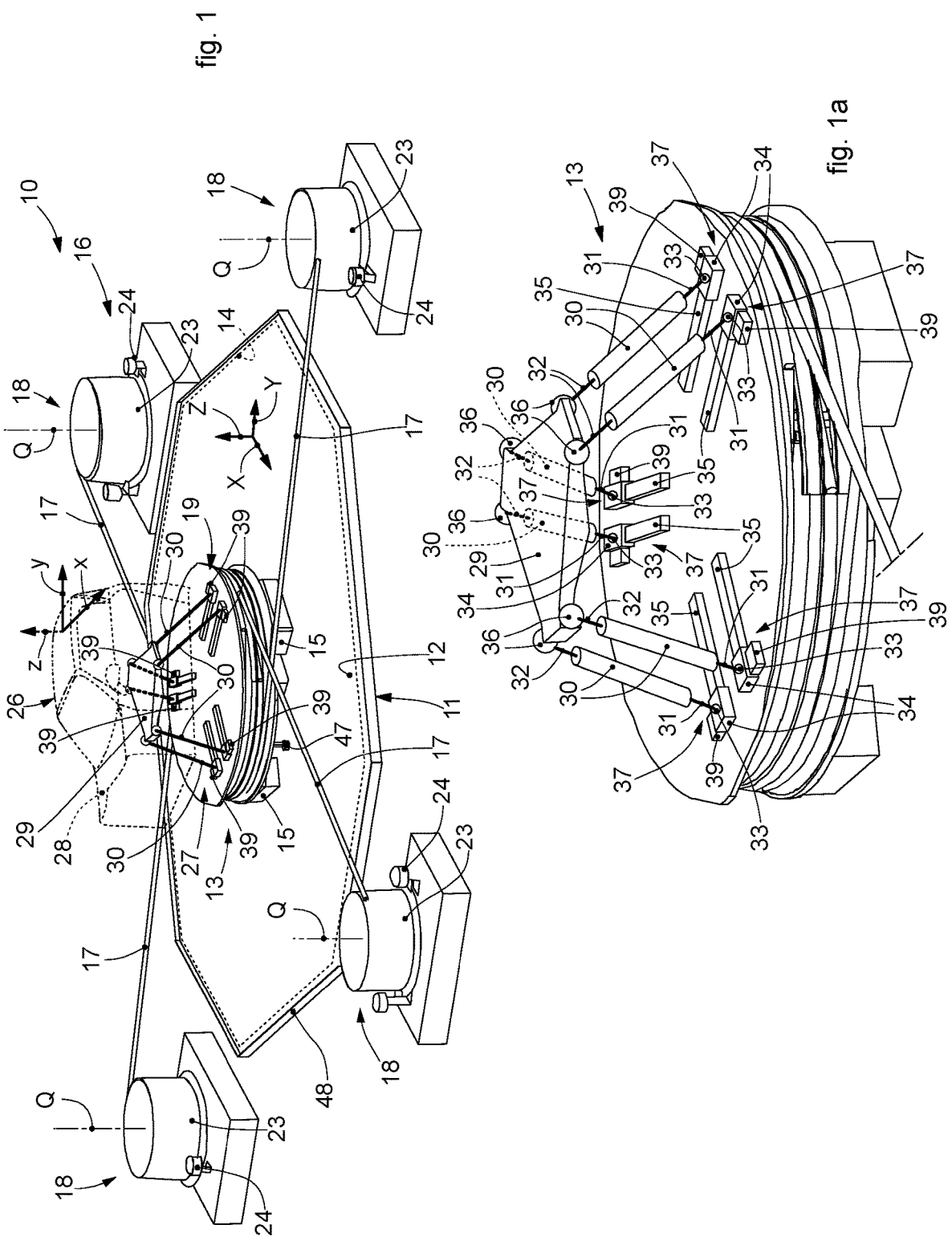
FIG. 1 is a perspective view of an apparatus for simulating driving a land vehicle in accordance with some embodiments described here.
FIG. 1a shows an enlarged detail of FIG. 1.

FIG. 1 shows an apparatus for simulating driving a land vehicle, according to the present invention, indicated as a whole here and hereafter in the description with reference number 10.

The apparatus 10 comprises a fixed base 11 provided with a flat support surface 12 on which a mobile platform, or disk, 13 is located.

The base 11 can be defined by the floor of a building, by a platform or by a suitably made stand.

The base 11 can have a substantially rectangular shape, or it can have different shapes and sizes, for example a polygonal, circular or combined curved and polygonal shape.

The support surface 12 is suitably finished, for example, by grinding and polishing, in order to make it extremely smooth and allow the mobile platform 13 to slide on it with extremely low friction, by means of suitable sliding means.

The support surface 12 defines a movement space 14 which delimits the work field within which the mobile platform 13 can move, FIG. 1.

The support surface 12, and the movement space 14 defined thereby, have a surface extension in plan larger than the plan sizes of the mobile platform 13.

In accordance with possible solutions of the present invention, the apparatus 10 comprises sliding means 15 associated with the mobile platform 13 to allow the latter to slide on the support surface 12.

According to possible embodiments, the sliding means 15 can comprise pneumostatic sliding blocks which, in combination with a magnetic effect, are configured to generate an air gap between the base 11 and themselves, allowing the mobile platform 13 to be slightly raised, in order to allow it to slide on the support surface 12.

In some embodiments, the sliding means 15 can comprise mechanical-type elements, such as ball bearings.

According to some variants, the sliding means 15 can comprise magnetic-type elements, such as bearings with magnetic support.

In accordance with some embodiments, the apparatus comprises first movement means 16 associated with the base 11 and the mobile platform 13 and configured to move the mobile platform 13 on the support surface 12.

The first movement means 16 are able to translate the mobile platform 13 on the support surface 12 in a first direction X and a second direction Y which is coordinated with respect to the first direction X, and to rotate the mobile platform 13 around a third direction Z perpendicular to the support surface 12 and coordinated with respect to the first direction X and the second direction Y. The rotation of the mobile platform 13 around the third direction Z allows to simulate the yaw of a vehicle.

The first direction X, the second direction Y and the third direction Z therefore define a first Cartesian axis system that has as reference the fixed base 11.

It is evident that, by suitably combining the movements in the first direction X and the second direction Y, it is possible to move the mobile platform 13 in any direction that lies on the plane of the support surface 12.

With the first movement means 16 it is therefore possible to provide to control three degrees of freedom.

In accordance with one possible solution of the invention, the first movement means 16 comprise a plurality of cables 17 connected with a first portion thereof to the mobile platform 13 and with a second portion thereof to respective actuation members 18 which are configured to move the cables 17 and vary the distance between the zone of connection of the cable 17 to the mobile platform 13 and the zone of connection of the cable 17 to the actuation members 18, and determine a movement of the mobile platform 13 with respect to the base platform 11.

According to possible solutions, the first movement means 16 comprise four actuation members 18 disposed distanced from each other, for example according to a pattern of the vertices of a rectangle.

According to possible embodiments, the actuation members 18 can be installed in a fixed position with respect to the base 11, for example they can be installed on the base 11, for example at the margins of the latter.

By way of example only, it can be provided that the actuation members 18 are installed on the base 11 outside the movement space 14.

However, we do not exclude that the actuation members 18 are installed on fixed structures outside the base 11, as shown in FIG. 1.

In accordance with possible embodiments, the actuation members 18, by means of their actuation, keep the respective cable 17 associated therewith in tension to ensure the positioning, and the keeping in position, of the mobile platform 13 with respect to the base 11.

According to some embodiments, the mobile platform 13 is provided with a connection body 19 in correspondence with which the cables 17 are connected.

According to a possible formulation of the present invention, the connection body 19 has a discoid shape and the cables 17 are wound/unwound, during use, on its external circumferential surface.

According to one possible solution, each cable 17 can be connected with a first end thereof to a first one of the actuation members 18, be wound around the connection body 19, and enter the latter having a second end attached, for example, inside the connection body 19.

According to some embodiments, shown in FIG. 1, each actuation member 18 comprises a pulley 23 connected to a motor 24 configured to take the pulley 23 into rotation around its axis of rotation Q. The cable 17 is connected to the pulley 23, so that with a drive of the motor 24 it is possible to determine a winding or unwinding of the cable 17 on the pulley 23 and, consequently, the movement of the mobile platform 13 on the base platform 11.

The motor 24 can be chosen from a group comprising an electric motor or a hydraulic motor.

The axis of rotation Q of the pulley 23 is preferably orthogonal to the support surface 12, thus allowing to keep the cables 17 substantially parallel to the support surface 12.

Between the motor 24 and the pulley 23 there can be interposed a reduction member configured to reduce the rotation speed imparted by the motor 24 to the pulley 23.

According to possible embodiments, a movement member configured to move the actuation member 18 in a direction parallel to the axis of rotation Q of the pulley 23 can be connected to each actuation member 18, in order to keep the cables 17 substantially parallel to the base platform 11, that is, to the support surface 12 of the base platform 11.

In accordance with possible solutions, the movement member can comprise a screw jack, a linear actuator, a motor. By way of example only, the movement member can comprise a recirculating ball jack that precisely controls the movement of the pulley 23 as a function of the movements that are imparted to the mobile platform 13.

According to possible embodiments, the mobile platform 13 can move in the first direction X and in the second direction Y, and rotate around the third direction Z according to the unwinding or winding of the cable 17 on the pulleys 23 and the simultaneous winding or unwinding of the cable 17 on the connection body 19.

In accordance with a possible alternative embodiment, not shown in the drawings, the first movement means 16 can comprise a plurality of linear actuators, such as screw jacks, or recirculating ball jacks connected with a first end thereof in a fixed position and outside the movement space 14, and with a second end thereof, opposite the first, connected to the mobile platform 13.

According to one possible solution, the second ends of these linear actuators can be connected on a circumference which is contained in the mobile platform 13. According to other embodiments, the number of linear actuators is three and, in at least one operating position thereof, they are disposed so that they are reciprocally angled with respect to each other by an angle of about 120°. It can also be provided that such linear actuators all lie on a common lying plane which is substantially parallel to the support surface 12.

In accordance with some embodiments, shown in FIG. 1, the apparatus 10 comprises a driving position 26 installed on the mobile platform 13. Second movement means 27 are interposed between the mobile platform 13 and the driving position 26.

According to possible embodiments, the driving position 26 can cooperate with a projection screen, on which a driving environment is projected in which to immerse the driver and/or one or more passengers during the simulation.

The driving position 26 can comprise a frame 28, or shell, which at least partly reproduces the cabin of the vehicle, FIG. 1.

In the cabin defined by the frame 28 there can be present, for example, a seat and control means for a driver, such as a steering wheel, pedals, and an instrument panel, not shown in the drawings.

Alternatively or in addition, seats for one or more passengers can be present.

The driving position 26 can comprise a support plate 29 to which the second movement means 27 are connected. The support plate 29 can be integrally associated with the frame 28.

In accordance with some embodiments of the present invention, the second movement means 27 allow the movement of the driving position 26, both linear translation and also rotary with respect to a fourth direction x, a fifth direction y and a sixth direction z.

The fourth x, fifth y and sixth z directions define a second system with Cartesian axes which are parallel to the Cartesian axes X, Y and Z of the first system in original and static conditions of the mobile platform 13; the second Cartesian axis system x, y and z is however integral and mobile together with the mobile platform 13.

The second movement means 27 therefore allow, in addition to the translation movements, part of which constitute redundancy with respect to the similar movements of the mobile platform 13, the rotation of the driving position 26 around the fourth direction x (called roll in the sector), the fifth direction y (called pitch in the sector) and the sixth direction z (called yaw in the sector).

Here and hereafter in the description, the lowercase letters x, y, z refer to the second Cartesian axis system integral with the driving position 26, while the uppercase letters X, Y, Z refer to the first Cartesian axis system integral with the mobile platform 13.

The division of the degrees of freedom, that is, of the movements of the driving position 26 as defined by the first movement means 16 and by the second movement means 27, is in this case optimized for simulating driving land vehicles.

In fact, the accelerations in the plane defined by the first direction X and the second direction Y and the yaws (yaw rotation around the Z axis) occur at a lower frequency, that is, with transients that can be even very prolonged over time, and therefore are associated with the first movement means 16 and actuated by means of the cables 17; small movements in the fourth direction x, the fifth direction y and around the sixth direction z, in addition to the pitch, roll and the movements in a direction orthogonal to the support surface 12, are present with short transients and are actuated by means of the second movement means 27.

This subdivision and redundancy of the control of the degrees of freedom allows, therefore, to optimize the conformation, as well as the control and management of the first movement means 16 and of the second movement means 27, in relation to the simulations, typical of a land vehicle, which have to be performed.

In accordance with some embodiments, shown in FIG. 1a and in FIGS. 2-6, the second movement means 27 comprise a plurality of preferably cylindrical connection elements 30, each associated with a respective first end 31 to the mobile platform 13, and with a second end 32, opposite the first end 31, directly or indirectly, to the driving position 26.

With particular reference to FIG. 1a, each of the first ends 31 is pivoted with a base joint 33 to a corresponding sliding block 34 slidingly associated with a rectilinear guide 35, and each of the second ends 32 is pivoted to the guide platform with a butt joint 36. In particular, the sliding block 34 and the guide 35 define another base joint 37 of the prismatic type.

According to some embodiments, the base joint 33 can be of a universal type.

According to an alternative solution, the base joint 33 can comprise two rotoidal joints with intersecting axes of rotation.

According to some embodiments, the butt joint 36 can be of the spherical type. The second end 32 can be articulated directly to the driving position 26 or to the support plate 29, directly or by means of support elements 38, FIGS. 7-9.

According to some embodiments, shown in FIGS. 2-3 and FIGS. 5-6, the second movement means 27 can comprise a plurality of the guides 35, in a number coordinated with that of the connection elements 30 as above.

According to further embodiments, the connection elements 30 can be provided of a torsion feature, for example being made by two components inserted one inside the other and having the ability to rotate one respect to the other.

In alternative solutions, it is possible to provide that the second movement means 27 comprise a plurality of the guides 35 in a number smaller than the number of the cylindrical connection elements 30 present. For example, the first ends 31 of some distinct cylindrical connection elements 30 can be sliding on respective distinct segments of a same guide 35, FIG. 4.

According to some embodiments, shown in FIGS. 1-2 and FIGS. 7-9, with each guide 35 there can be associated an actuation member 39 to activate the movement of the first end 31 on the guide 35, moving the sliding block 34 on which it is pivoted. Such movement can, for example, be operated by means of a grub screw mechanism, possibly by means of a belt connected to the actuation member 39.

The actuation member 39 can advantageously be attached in correspondence with the foot of the respective guide 35, on a support surface or plane of the mobile platform 13. The position of the actuation members 39 allows to have a limited number of masses in movement and therefore to improve the dynamic response of the system.

According to one possible variant, the actuation member can be aligned with the respective guide 35, for example attached in a position even different from the foot of the guide 35 and such as not to interfere with the movement of the sliding block 34.

For example, by moving in a coordinated manner the first ends 31 of the connection elements 30 along the respective guides 35, it is possible to define an overall translation movement of the driving position 26 in one of either the fourth x, fifth y and sixth z direction or in a combination thereof, or an overall rotation movement of the driving position 26 around the same directions.

According to some embodiments, the second movement means 27 comprise a number of connection elements 30 sufficient to achieve the desired movements.

According to some embodiments, the second movement means 27 comprise six connection elements 30 associated with a respective number of guides 35.

According to possible embodiments, the second movement means 27 comprise a number of connection elements 30 also different from six, for example between three and eight.

Figures 2, 3, 4, 5, 6:
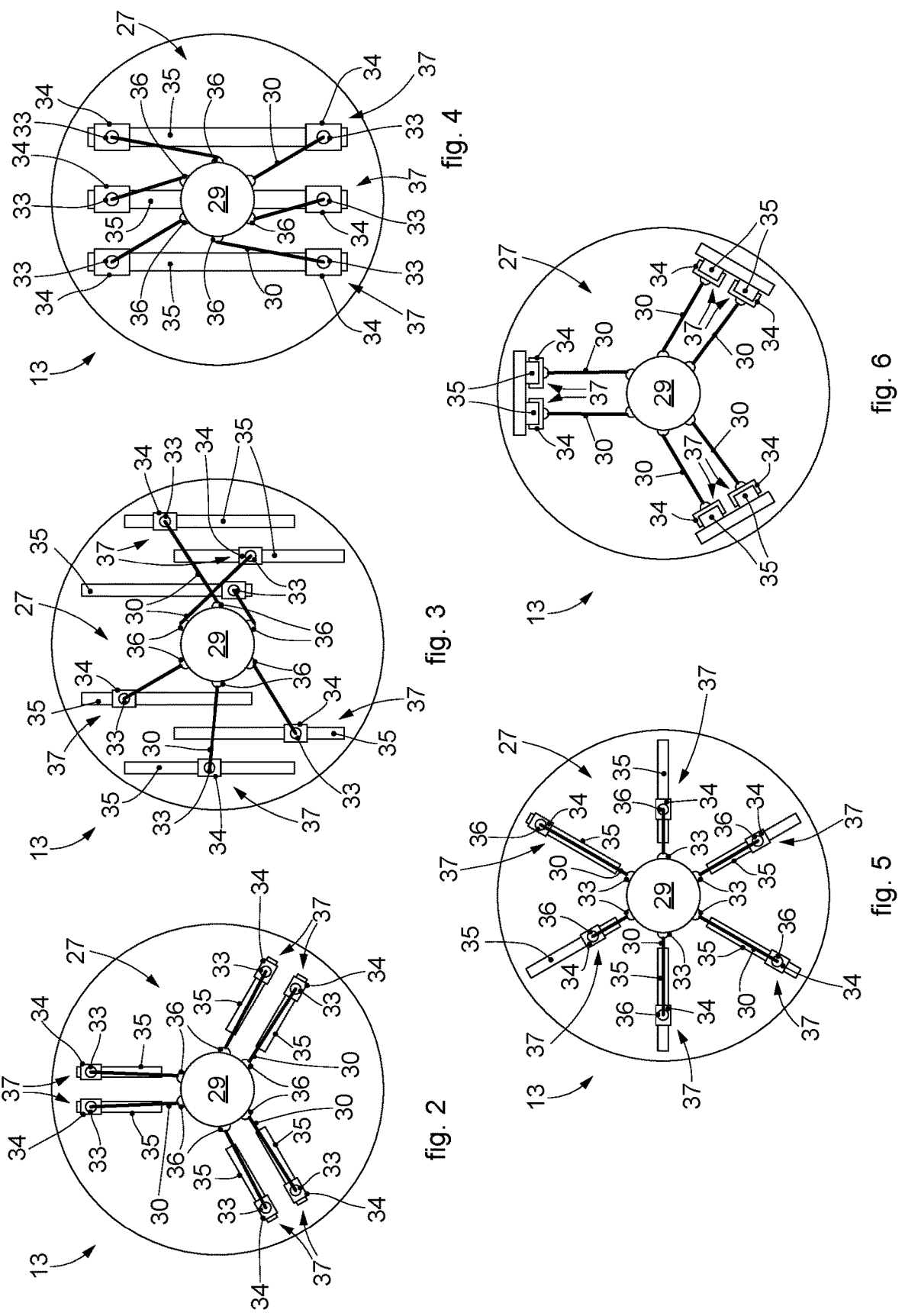
FIGS. 2-6 are schematic top plan views of possible configurations of the second movement means, in particular of possible dispositions of the guides.

According to possible embodiments, shown in FIGS. 3-4, the second movement means 27 have a configuration symmetrical with respect to a vertical median plane. For example, such vertical median plane is orthogonal to the mobile platform 13. In this case, the guides 46 can all be parallel to each other and define a predominant direction of movement of the driving position 26.

According to some embodiments, shown in FIG. 2 and FIGS. 5-6, the second movement means 27 have a radial symmetry configuration with respect to a central vertical axis of the mobile platform 13. For example, such central vertical axis is orthogonal to the mobile platform 13. In this case, the guides 46 can be converging toward the center of the mobile platform 13.

According to some embodiments, the guides 35 can be organized into groups. For example, in the case of a configuration symmetric with respect to a vertical median plane, the guides 35 can be equal in number on one side and on the other of the plane, FIG. 3 or possibly in correspondence therewith, FIG. 4. In the case of a radial symmetry configuration, the guides 35 can be grouped into pairs. Favorably, the guides 35 of each pair can be parallel to each other.

According to one possible embodiment, shown in FIGS. 1-2 and FIGS. 7-10, in the case of a radial symmetry configuration, one pair of guides 35 can be angularly distanced from another pair of guides 35 at an angle of about 120°.

According to one possible embodiment, always in the case of a radial symmetry configuration, the guides 35 can be independent, that is, not grouped together. In this case, the guides 35 are not parallel to each other and the extension of their axes of development intersects a central point of the mobile platform 13, FIG. 5.

According to possible embodiments, the guides 35 can be attached to a support surface of the mobile platform 13 which is substantially parallel to the support surface 12. Such support surface can be configured as a flat frame or a plate on which the guides 35 are attached.

According to some embodiments, the guides 35 can be attached to support planes of the mobile platform 13, which are inclined with respect to the support surface 12. Such a configuration with inclined guides is called a hexalift. In addition to making the second movement means 27 particularly compact, this solution allows a greater excursion of the driving position in the sixth direction z.

Figures 7, 8:
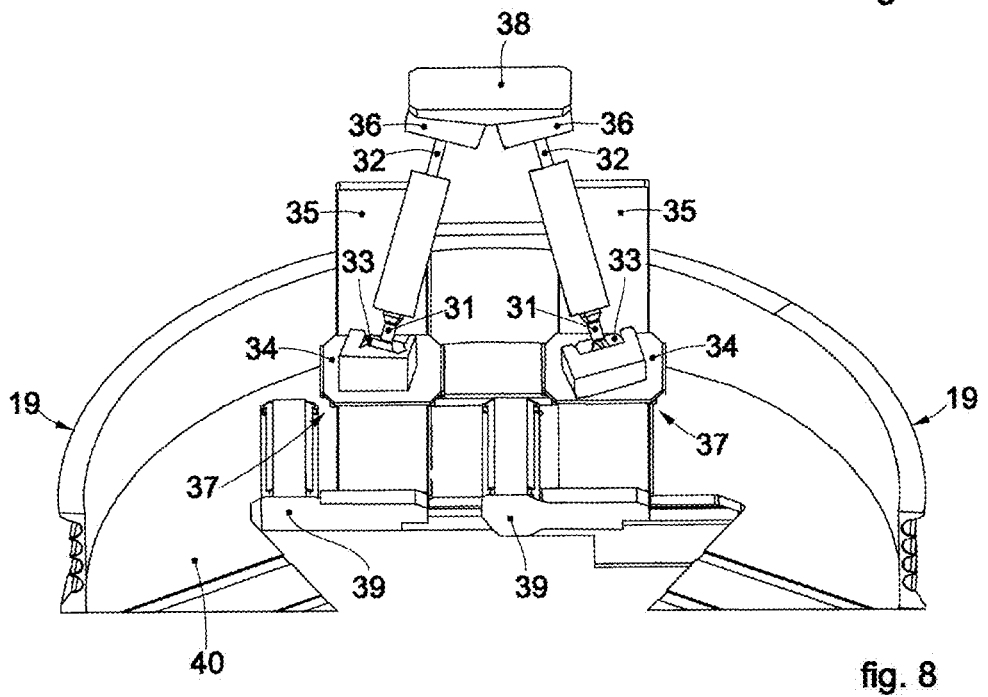
FIG. 7 shows a possible embodiment of the mobile platform and of the second movement means associated therewith, in accordance with some embodiments described here.
FIG. 8 is an enlarged detail of FIG. 7.
Figures 9, 10:
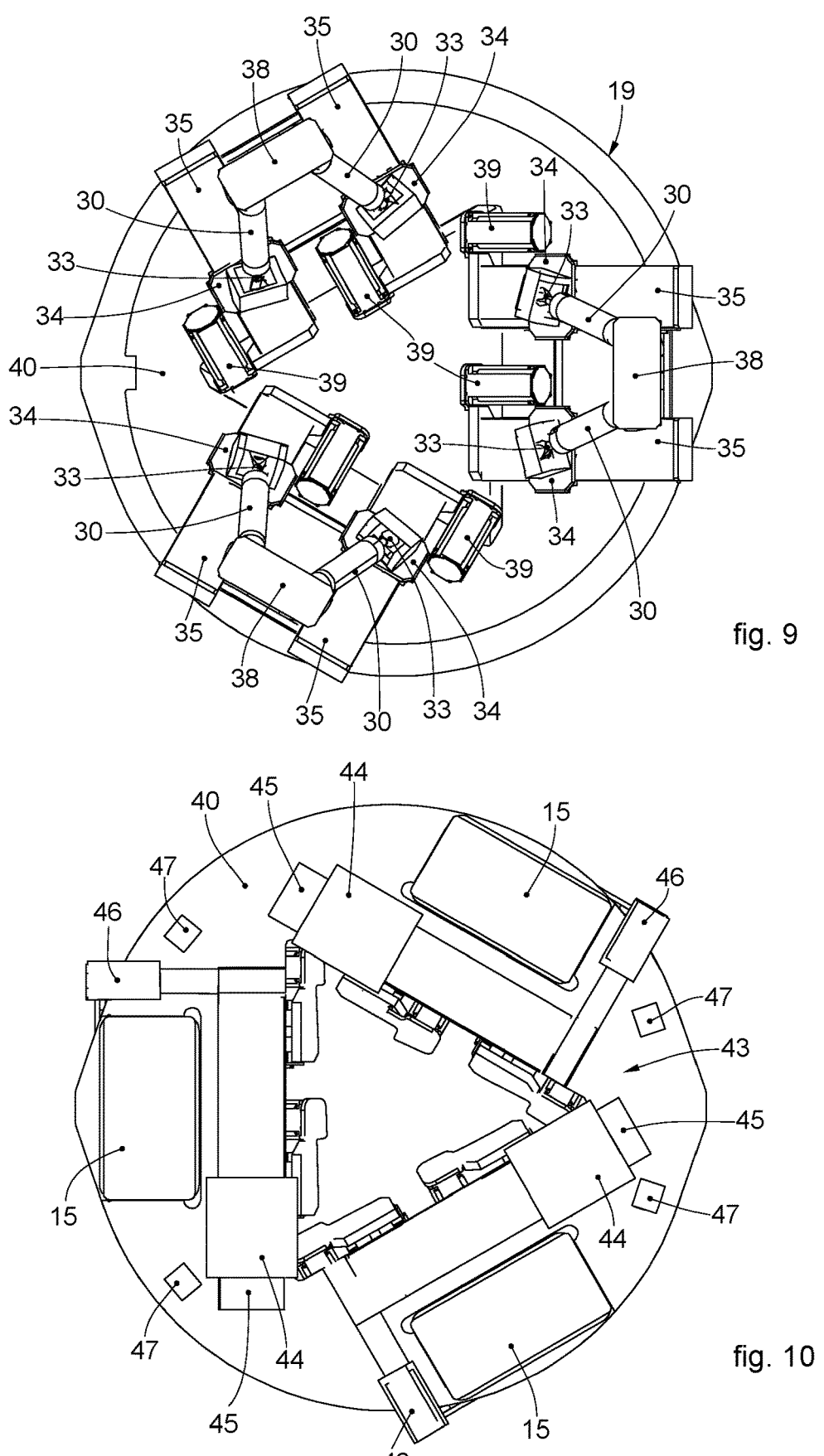
FIG. 9 is a top view of FIG. 7.
FIG. 10 is a bottom view of FIG. 9.

With particular reference to the example of FIGS. 7-9, the guides 35 are inclined with respect to the support surface 12 and are disposed inside the connection body 19. Each guide 35 is firmly connected on one side to the extreme upper part of the circumferential surface of the connection body 19, and on the opposite side to a bottom wall 40 of the connection body 19, thus resulting inclined. In this case, the support plane is defined by the extreme upper part and by the bottom wall 40. This solution allows to make the apparatus 10 compact by reducing bulk of the second movement unit 27.

According to possible embodiments, the support planes can be vertical, that is, orthogonal to the mobile platform 13, FIG. 6.

According to some embodiments, the connection elements 30 have a fixed length. However, we do not exclude the possibility of varying the length of the connection elements 30, for example by introducing other prismatic joints in an intermediate position.

According to some embodiments, the connection element 30 comprises a central body which has a tubular shape, favorably hollow, and a pair of pivot rods, defining the first end 31 and the second end 32. The connection element 30 comprises a pair of bearing units associated with the central body and able to transmit the rotation around the axis of development of the central body.

According to one possible embodiment, shown in FIG. 10, a compensation unit 43 configured to limit or cancel the oscillations induced on the cables 17 by the high frequencies of the second movement means 27 can be associated with the mobile platform 13.

According to possible embodiments, the compensation unit 43 can also be configured to displace the inertial mass of the mobile platform 13 by coordinating and harmonizing the action exerted by the cables 17 to determine a very realistic driving experience.

According to some embodiments, the compensation unit 43 can comprise balancing masses 44 mobile on respective sliding guides 45 by means of respective actuation members 46 which are configured to move the balancing masses 44 with respect to the mobile platform 13 in order to induce on the latter inertia forces such as to reduce or eliminate the oscillations of the mobile platform 13, or possibly harmonize the movement in a determinate direction.

The sliding guides 45 can be stably attached to the bottom wall 40 of the connection body 19, outside the latter.

The sliding guides 45 are oriented so as to allow the movement of the respective balancing masses 44, associated therewith, according to the degrees of freedom of the mobile platform 13.

The sliding guides 45 are disposed orthogonally to the guides 35 and are parallel and facing the support surface 12.

According to some embodiments, the sliding guides 45 are reciprocally disposed so as to form angles of about 60° between each other.

According to a possible solution, each actuation member 46 is configured to allow a translation of the respective balancing mass 44 in one direction, substantially parallel to the support surface 12. In this way, a compensation unit 43 is obtained which is able to act according to three degrees of freedom.

In accordance with some embodiments, the compensation unit 43 can be installed in the barycentric position of the mobile platform 13 in order to optimize the compensation actions.

According to some embodiments, the mobile platform 13 is provided with a plurality of emitter-receiver devices 47 positioned so as to emit a forward signal against an edge 48 that delimits the support surface 12, and receive a correlated return signal reflected by the edge 48. This allows to determine the position of the mobile platform 13 on the support surface 12.

In accordance with some embodiments, the signal emitted by the emitter-receiver devices 47 can be of the laser type.

In accordance with possible embodiments, the signal emitted by the emitter-receiver devices 47 can be of the ultrasound type.

In other embodiments, the mobile platform 13 can be equipped with position detection devices, for example wire type encoders.

It is clear that modifications and/or additions of parts may be made to the apparatus for simulating driving a land vehicle as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. Apparatus for simulating driving a land vehicle, comprising:
   a base provided with a flat support surface on which a mobile platform is positioned,
   first means for moving said mobile platform along two linear directions perpendicular to each other (X, Y) and for rotating said mobile platform along a third direction, or axis, that is perpendicular to a plane that contains the X, Y, directions, wherein said first movement means comprise a plurality of cables connected with a first portion thereof to the mobile platform and with a second portion thereof to respective actuation members, which are able to determine a movement of the mobile platform with respect to the base,
   a driving position associated with said mobile platform, and
   second means for moving said one driving position with respect to the mobile platform, comprising a plurality of linear connection elements, each associated with a respective first end to the mobile platform, and with a respective second end, opposite the first end, directly or indirectly to the driving position,
   wherein each of said first ends is pivoted with a base joint to a corresponding sliding block, the sliding block slidingly associated with a rectilinear guide, and each of said second ends is pivoted to the driving position with a butt or cardanic joint, said sliding block and said guide defining another base joint, wherein said second means allow a movement of said driving position according to further three directions (x, y and z), and a rotation around the same three directions (x, y and z), and
   wherein said mobile platform is provided with a hollow connection body open at least at a top part to which said cables connect, and in that said guides are disposed at an incline with respect to the support surface inside said connection body, each guide being stably connected on one side to an upper part of said connection body and on an opposite side to a bottom wall of said connection body.

2. The apparatus of claim 1, wherein said base joint is of the universal a universal type and said butt or cardanic joint is of a spherical type.

3. The apparatus of claim 1, wherein said base joint comprises two rotoidal joints with intersecting axes of rotation, and said butt joint is of a spherical type.

4. The apparatus of claim 1, wherein said second movement means comprise a plurality of said guides, in a number coordinated with that of said connection elements.

5. The apparatus of claim 1, wherein said second movement means comprise a plurality of said guides in a number smaller than the number of said connection elements.

6. The apparatus of claim 1, wherein said second movement means comprise six connection elements.

7. The apparatus of claim 1, wherein said second movement means has at least a configuration symmetrical with respect to a vertical median plane of said mobile platform, and wherein said guides are parallel to each other.

8. The apparatus of claim 1, wherein said second movement means has at least one radial symmetry configuration with respect to a central vertical axis of said mobile platform, and wherein said guides converge toward a central point of said mobile platform.

9. The apparatus of claim 8, wherein said guides are grouped into pairs, wherein at least the guides of each pair are parallel to each other.

10. The apparatus of claim 1, wherein said guides are attached to a support plane of said mobile platform which is parallel to said support surface.

11. The apparatus of claim 1, wherein said guides are attached to support planes of said mobile platform which are inclined with respect to said support surface.

12. The apparatus of claim 1, wherein said connection elements have a fixed length.

13. The apparatus of claim 1, wherein the mobile platform is provided with a plurality of emitter-receiver devices positioned so as to emit a forward signal against an edge delimiting the support surface and receive a correlated return signal.

14. The apparatus of claim 1, further comprising a compensation unit comprising balancing masses mobile on respective sliding guides by means of respective actuation members and attached to the mobile platform.

* * * * *